METHOD FOR PUTTING A GLASS COMPOSITION IN OVEN POTS

Filed Oct. 26, 1946

INVENTORS:
GEORGES HENRY and
EDGARD BRICHARD

United States Patent Office 2,711,837
Patented June 28, 1955

2,711,837

METHOD FOR PUTTING A GLASS COMPOSITION IN OVEN POTS

Georges Henry and Edgard Brichard, Jumet, Belgium

Application October 26, 1946, Serial No. 706,006

Claims priority, application Belgium June 22, 1946

4 Claims. (Cl. 214—152)

This invention relates to method for the introduction of glass composition into glass furnaces or pot ovens in a manner so as to improve the technical and economical conditions of glass melting. Methods are known according to which such composition is put into the oven in a discontinuous manner either by intermittently forming on the glass surface heaps of composition which are pushed forward by means of tools or of mechanical systems or else by distributing and pushing forward the composition through mechanisms performing a reciprocating motion thereon. In such known methods certain time intervals separate the successive operative periods during which the composition is actually moved into the furnace. For feeding a predetermined amount of composition, it is therefore necessary to advance during the operative periods heaps or sheet layers of composition at a speed which is higher than if the feed of said sheet layers were continuous.

Other means for putting the composition into the oven are known, wherein the feed of the composition is obtained through the operation of worms urging the composition forward in a continuous manner through hollow chutes. A comparatively large lump or roll of composition is discharged from each apparatus into the oven and it is not possible to obtain in this manner a thin uniform and continuous sheet of composition moving over the surface of the molten glass.

It has been found that the melting of the glass is accelerated and that the product obtained is more homogeneous when the thickness of the layers of composition put into the oven or hearth is reduced while their horizontal stretch over the surface of molten glass is correspondingly increased. It has been found that by reason of the high resistance offered by the composition to the transmission of heat, the above-mentioned advantageous action increases for each further reduction in the thickness of the composition layer even if the layer considered is already very thin. It is therefore of interest to provide means for advancing the glass composition in a uniform continuous layer which is as thin as possible.

The obtainment of such a thin layer is however limited by the fact that it is difficult to forwardly move a very thin loose layer of composition floating according to the invention over the glass by reason of its resistance against movement in the direction of feed due to the viscosity of the underlying molten glass and to the thermal currents or streams which have a direction opposed to that of the advancement of the composition.

The resistance to feed due finally to the viscosity of the glass is proportional to the speed at which it is desired to drive forward the composition to be put into the oven.

Our invention has for its object to overcome the above-mentioned drawbacks and relates to method for continuously feeding the composition into the pot oven in the form of an adjustable layer which is as thin as may be desired.

To this end, the method according to our invention consists in depositing onto the surface of the molten glass extending in the direction of the pot a thin layer of composition and causing the latter to advance on said surface at a speed which is substantially uniform by driving said layer forward by means of a member ensuring a continuous movement.

In the practical execution of the invention, the continuous forward movements may be executed at an adjustable speed so as to maintain a balance between the amount of composition put into the oven and the actual production of the melting pot.

The acceleration or slowing down of the speed of feed may be controlled automatically through the agency of an indicator signalling the rising and sinking of the glass level inside the pot.

The arrangement used for executing this method is characterized by the provision in the vicinity of the glass of a continuously moving member lying above and acting on the layer of composition covering a portion of the glass surface and carrying it along through contact by a movement tangential to its own.

This contact may be improved if the member assuming a continuous movement is provided with parts projecting beyond its surface, thereby engaging the layer of composition and moving the same on the surface of the molten glass.

The member executing a continuous movement is preferably constituted by a continuous belt driven by two rotary members and advancing the aforesaid layer a certain length in parallelism with and over the surface of the molten glass.

This belt is preferably constituted by a plurality of metal parts, such as blades to which are secured smaller blades or projections adapted to lightly push said layer of glass composition over the surface of the molten glass.

According to another form of execution of the invention, the continuously advancing member is constituted by a single cylinder the surface of which contacts with the sheet of composition through a generating line.

Said cylindrical surface is provided with small blades, projections and the like which engage the composition to feed and slide the same along and above the surface of the glass.

The engagement of the small blades or projections with the batch or layer is adjustable.

In order to allow the invention to be better understood, we will disclose hereinafter various forms of execution. In the appended drawings.

Figure 1:
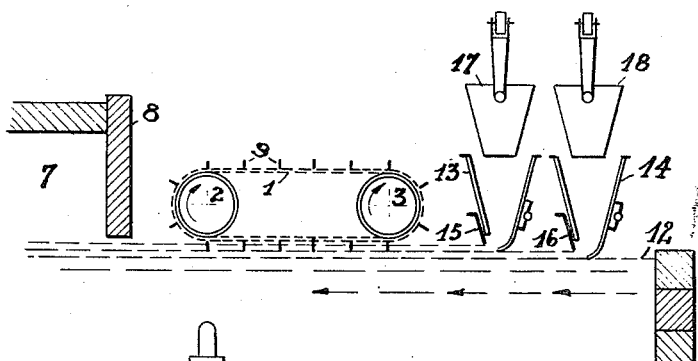
Fig. 1 is a diagrammatical elevational cross-sectional view of an embodiment according to the invention.
Figure 2:
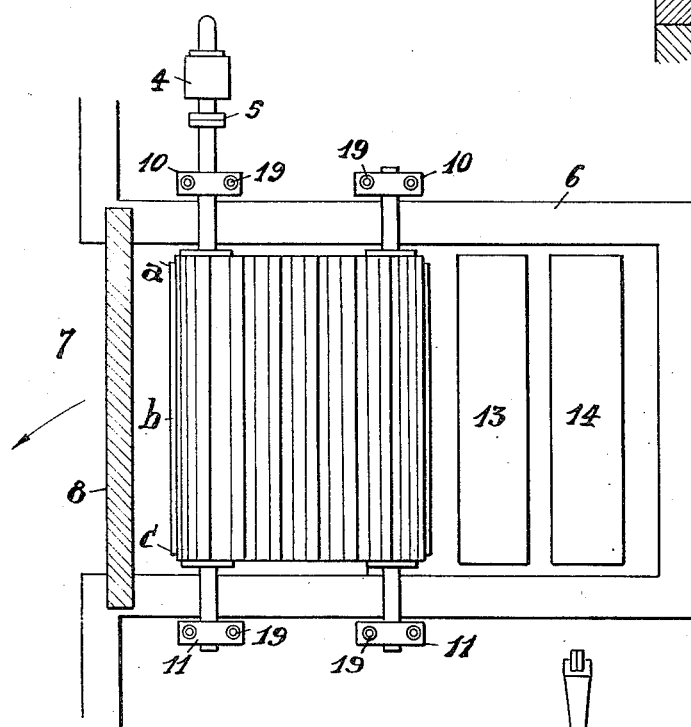
Fig. 2 is a corresponding plan view thereof.

In Figs. 1 and 2 there is shown an endless belt 1 provided in accordance with any of the known methods or else as illustrated with a series of blades made of a metal resisting the action of heat and hinged to one another. Said belt is drawn over two rollers 2 and 3 and may be started through the rotation of the roller 2 controlled in its turn by an aggregate 4 including a motor and a speed reducer, coupled with said rollers through a stress limiting clutch 5.

The belt 1 covers a certain stretch of the surface of the molten glass occupying the part 6 of the pot or furnace 7 used for melting. This part of the pot or furnace shows preferably a width very near that of the pot itself so as to increase the area of the sheet of composition put into the oven. It is possible with the same pot to provide a plurality of parts or branches each of which is associated with an arrangement of the type disclosed.

The atmosphere in the oven proper is practically isolated from room atmosphere by means of a refractory member 8 the height of which above the glass is adjustable.

To the blades of the belt 1 are secured at intervals smaller blades 9 forming feeding means and projecting towards the outside of said belt.

The height of the lower strand of the endless belt above the glass is adjustable by means of screws 19, which adjust the bearings 10 and 11 of the rollers 2 and 3 resting on their supports. When the lower strand comes into contact with the layer of composition lying over the glass, it carries it along so as to execute a movement parallel with or substantially tangential to its own, the blades 9 improving said action.

When the apparatus is started, the small blades 9, being in contact with the glass surface, drive the latter and cause it to assume a movement tangential to their own. As however the glass at the surface of the bath assumes through its cooling a cohesion which is greater than that of the underlying mass of glass, the drive is not limited to the zone lying immediately underneath the belt but affects the whole surface of the glass rearwardly of said zone and extending up to the rear wall 12 of the oven extension part where the glass surface is not in contact with the supplied glass composition and is allowed to cool down at its surface to form a fine glass film thereon, which has a predetermined relatively large cohesion.

Behind the propelling mechanism described hereinabove, there are arranged one or more distributing members of a well known type, which are adapted to deposit on the moving glass film surface one or more uniform layers of material; in the case of a plurality of layers, said layers should be superposed in desired sequence.

We may use hoppers 13 and 14 opening at their lower end through slots 15 and 16 of adjustable height. The hoppers may be provided with vibrating means which further the regular supply of the material, thus providing a continuous feed thereof.

These hoppers may be fed in an intermittent or continuous manner through any suitable arrangement, for instance by means of skips 17 and 18 rolling over single rails.

The arrangement thus executed operates in the following manner once normal running is established.

The metal belt 1 drives, as it moves along, the superposed strata or layers of composition (from hoppers 13 and 14) by small blades 9 provided on said belt.

Said layers of glass composition are urged towards the oven beyond the roller 2 under the action of the continuous admission of fresh composition material.

The movement is transmitted to the underlying glass film surface which is slightly cooled through radiation at the location 12 and also due to contact with the supplied cool glass composition and starts the latter to move through a tractional stress extending up to the points lying underneath the distributors 13 and 14 which place on the glass film surface suitable relatively thin layers of material under the most convenient conditions.

It should be noted that if a part of the propelling mechanism is raised so that its action on the stratum or layer of glass composition is only exerted between $a$ and $b$, while on the contrary the layer is not urged forward in the zone between $b$ and $c$, the layer as a whole will be submitted to a rotary movement and is shifted towards the point $c$ as illustrated by the arrow $d$.

We may thus, by raising either pair of bearings 10 and 11, provide easy means for shifting the layer of composition put into the furnace towards the corresponding side of the pot.

This special feature is applicable to any method for continuous or discontinuous supply of glass composition to the oven, when it is possible to make the speed of progression of the mass put into the oven vary along a transversal line across the line of thrust.

Figure 3:
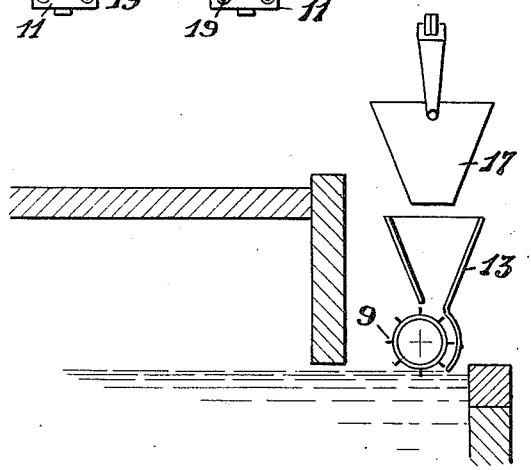
Fig. 3 is a diagrammatic elevational view of a modified embodiment.

It is possible in certain cases to simplify the above arrangement as illustrated in section in Fig. 3.

In this case, the belt 1 is replaced by a metal roller 2 which may be cooled if required through a circulation of a cooling fluid. This roller forms a feed member and is provided with blades 9. The feed or distributor hopper 13 is arranged above the roller.

The roller 2 plays the double part of a distributor for the quantitatively supplied fresh glass composition and of propeller means for the sheet layer of glass composition formed.

The operation of this arrangement is similar to that described and illustrated in Figs. 1 and 2.

Obviously it is possible to add as it is customary in the art a certain proportion of glass cuttings in admixture with the composition.

Obviously also said glass cuttings instead of being previously mixed to the layer of fresh glass composition may be laid as a uniform layer above or below said layer of glass composition.

Having thus described the invention, what is claimed as new and desired to be secured by Letters Patent, is:

1. The method of feeding vitrifiable materials into a glass furnace which comprises the steps of depositing vitrifiable material upon an underlying mass of fluent material including the molten glass in a feeding zone adjacent the inlet of said furnace, subjecting said deposited material and the fluent material immediately adjacent thereto to tractive force applied in a continuous manner and in an advancing direction to said layer of deposited material, thereby setting up in the molten glass a surface current flowing toward said furnace inlet, and, while continuing said application of tractive force, depositing additional vitrifiable material on said molten glass at a location subjected to said current, so that said current is effective to convey said additional material toward said furnace inlet.

2. The method of feeding vitrifiable materials into a glass furnace which comprises subjecting a mass of fluent material including the molten glass in a feeding zone adjacent the inlet of said furnace to tractive force applied adjacent the surface of said mass of fluent material in an advancing direction with respect to the furnace inlet, thereby setting up in the molten glass a surface current flowing toward said furnace inlet, and, while continuously applying said tractive force, depositing vitrifiable material in the form of a thin layer on said molten glass at a location subjected to said current, so that said current is effective to convey said vitrifiable material toward and through said furnace inlet.

3. The method according to claim 2 wherein the tractive force is applied continuously in an advancing direction and the vitrifiable material is deposited in a continuous manner on said molten glass to form a relatively thin layer of said deposited material thereon.

4. A method according to claim 2 wherein the rate of advance of said tractive force and the rate of deposition of vitrifiable material onto said advancing current of molten glass are so correlated as to feed continuously the vitrifiable material into said furnace in the form of a relatively thin layer.

References Cited in the file of this patent

UNITED STATES PATENTS

| | | |
|---|---|---|
| 1,623,057 | Kingsley | Apr. 5, 1927 |
| 1,916,262 | Good | July 4, 1933 |
| 2,261,022 | Fox et al. | Oct. 28, 1941 |
| 2,281,050 | Redshaw | Apr. 28, 1942 |
| 2,284,398 | Kutchka | May 26, 1942 |